US012672156B2

(12) United States Patent
Mu et al.

(10) Patent No.: US 12,672,156 B2
(45) Date of Patent: Jun. 30, 2026

(54) METHOD AND APPARATUS FOR SIDELINK BANDWIDTH PART CONFIGURATION

(71) Applicant: Beijing Xiaomi Mobile Software Co., Ltd., Beijing (CN)

(72) Inventors: Qin Mu, Beijing (CN); Qun Zhao, Beijing (CN); Xing Yang, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 301 days.

(21) Appl. No.: 18/565,255

(22) PCT Filed: Jun. 3, 2021

(86) PCT No.: PCT/CN2021/098171
§ 371 (c)(1),
(2) Date: Nov. 29, 2023

(87) PCT Pub. No.: WO2022/252190
PCT Pub. Date: Dec. 8, 2022

(65) Prior Publication Data
US 2024/0357625 A1 Oct. 24, 2024

(51) Int. Cl.
*H04W 72/40* (2023.01)
*H04W 72/0457* (2023.01)
*H04W 72/51* (2023.01)

(52) U.S. Cl.
CPC ....... *H04W 72/40* (2023.01); *H04W 72/0457* (2023.01); *H04W 72/51* (2023.01)

(58) Field of Classification Search
CPC ......... H04W 72/0453; H04W 72/0457; H04W 72/40; H04W 72/51
See application file for complete search history.

(56) References Cited

U.S. PATENT DOCUMENTS

| | | | |
|---|---|---|---|
| 2020/0053811 A1 | 2/2020 | Choi et al. | |
| 2020/0288434 A1 | 9/2020 | Choi et al. | |
| 2020/0328864 A1* | 10/2020 | Choi | H04L 5/0098 |
| 2020/0328865 A1* | 10/2020 | Choi | H04W 8/24 |
| 2020/0344030 A1 | 10/2020 | Cheng et al. | |
| 2020/0367050 A1 | 11/2020 | Yang | |
| 2022/0166593 A1* | 5/2022 | Choi | H04W 4/06 |

FOREIGN PATENT DOCUMENTS

| | | |
|---|---|---|
| CN | 110831126 A | 2/2020 |
| CN | 111316726 A | 6/2020 |
| CN | 111818648 A | 10/2020 |
| CN | 112889334 A | 6/2021 |

(Continued)

OTHER PUBLICATIONS

International Search Report mailed on Dec. 22, 2021 in PCT/CN2021/098171 filed on Jun. 3, 2021 (6 pages).
(Continued)

*Primary Examiner* — Kashif Siddiqui
(74) *Attorney, Agent, or Firm* — Oblon, McClelland, Maier & Neustadt, L.L.P.

(57) ABSTRACT

A method for sidelink bandwidth part configuration, performed by a first terminal, and including: determining sidelink bandwidth part configuration (BWP) information. The sidelink BWP configuration information is used for indicating a plurality of sidelink BWPs.

9 Claims, 8 Drawing Sheets

Determining sidelink bandwidth part configuration information, the sidelink bandwidth part configuration information being used for indicating a plurality of sidelink bandwidth parts

S11

(56)         References Cited

FOREIGN PATENT DOCUMENTS

WO      WO 2020/091270  A1      5/2020
WO      WO 2020/164355  A1      8/2020

OTHER PUBLICATIONS

Chinese Office Action Issued Jun. 17, 2023, in CN 202180001780.
X, 8 pages.
"Discussion on relay discovery of bandwidth limited remote UE",
ZTE, 3GPP TSG-RAN WG2 Meeting #99, R2-1708513, Aug. 2017,
5 Pages.

* cited by examiner

| Determining sidelink bandwidth part configuration information, the sidelink bandwidth part configuration information being used for indicating a plurality of sidelink bandwidth parts | S11 |

Determining sidelink bandwidth part configuration information, the sidelink bandwidth part configuration information being used for indicating a plurality of sidelink bandwidth parts, the plurality of sidelink bandwidth parts including at least one first sidelink bandwidth part, and the first sidelink bandwidth part belonging to a bandwidth capability range of a first type terminal

Determining sidelink bandwidth part configuration information, the sidelink bandwidth part configuration information being used for indicating a plurality of sidelink bandwidth parts, the plurality of sidelink bandwidth parts including at least one second sidelink bandwidth part, the second sidelink bandwidth part beloning to a bandwidth capability range of a second type terminal

Figures 3, 4, 5:
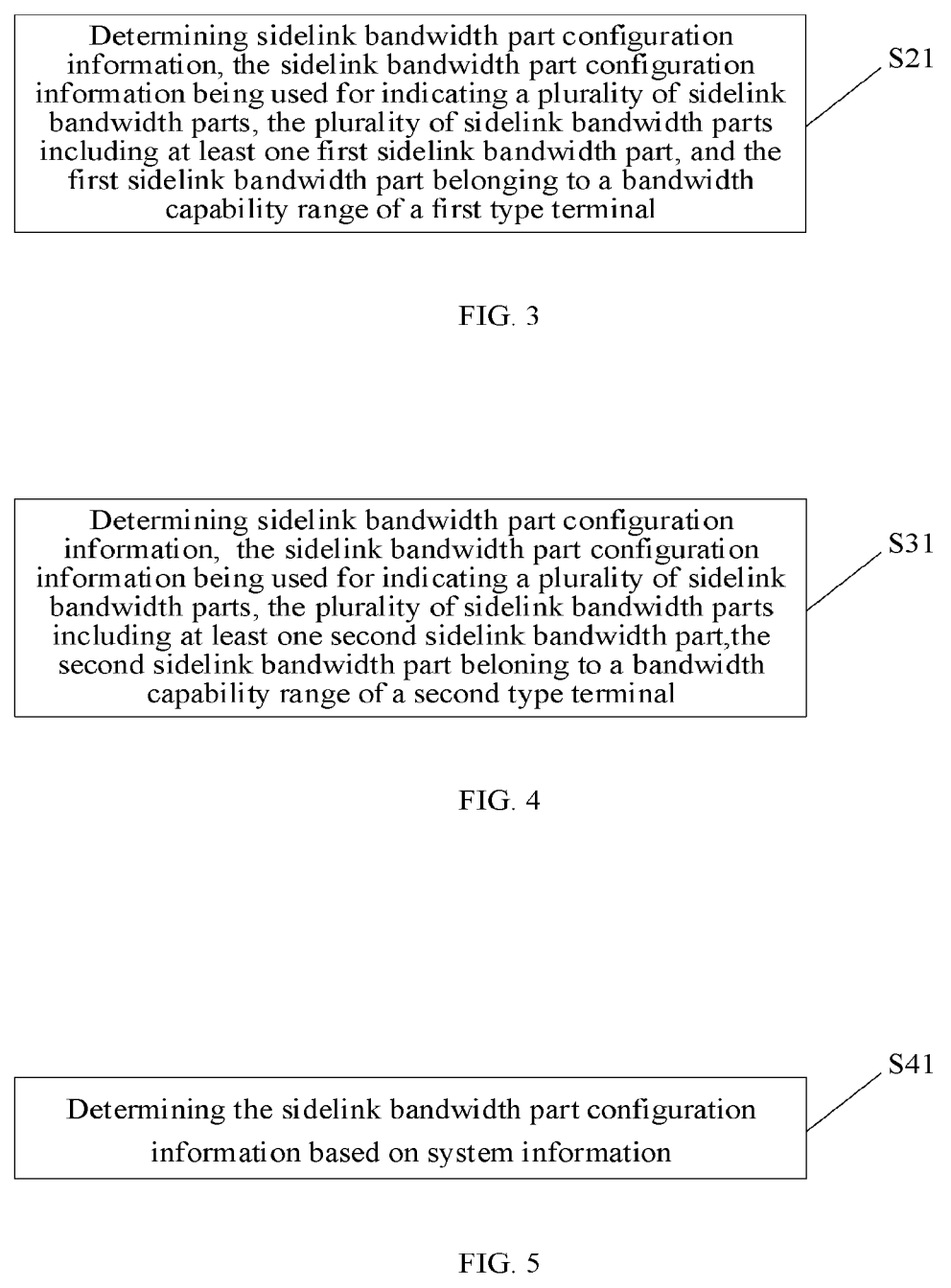

Determining the sidelink bandwidth part configuration information based on system information

Determining sidelink bandwidth part configuration information, the sidelink bandwidth part configuration information being used for indicating a plurality of sidelink bandwidth parts — S91

Sending the sidelink bandwidth part configuration information — S92

100

Processing unit — 101

Sending unit — 102

200
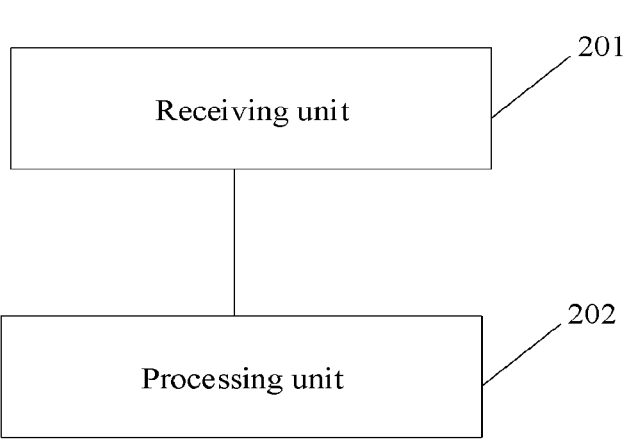
FIG. 12
300
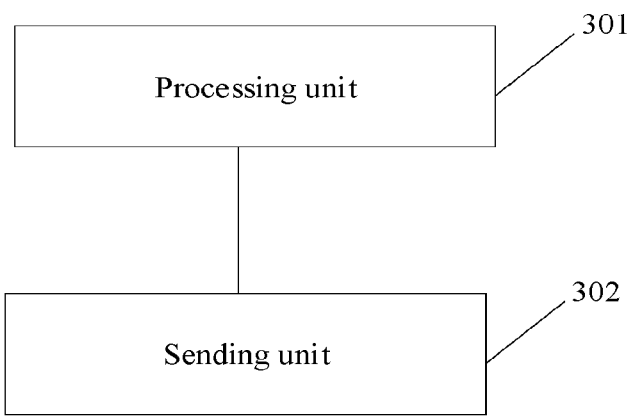
FIG. 13

METHOD AND APPARATUS FOR SIDELINK BANDWIDTH PART CONFIGURATION

CROSS-REFERENCE TO RELATED APPLICATION

The present application is a U.S. National Phase of International Application No. PCT/CN2021/098171, filed on Jun. 3, 2021, the contents of all of which are incorporated herein by reference in their entireties for all purposes.

BACKGROUND

Technical Field

The present disclosure relates to the field of communication technology, and in particular, to a method and apparatus for sidelink bandwidth part configuration, and a storage medium.

Description of the Related Art

In a Long Term Evolution (LTE) 4G system, in order to support the Internet of Thing services, two technologies of Machine Type Communication (MTC) and Narrow Band Internet of Thing (NB-IoT) are proposed. The two technologies are mainly directed to scenarios of low speed and high latency, such as scenarios of meter reading and environment monitoring, etc. At present, NB-IoT can support a maximum rate of hundreds of K, and MTC can support a maximum rate of several M. With the continuous development of Internet of Thing services, for example, popularization of services such as video monitoring, smart home, wearable devices, industrial sensing monitoring, or the like, these services typically require a rate of dozens to 100 M, while also have relatively higher requirements for latency. Therefore, it is difficult for the MTC and NB-IoT technology in the related art to meet these requirements. Thus, it is proposed that a new terminal type is redesigned in 5G New Radio (NR) to cover the requirements of a terminal Internet of Thing device. In the current 3 GPP standardization, this new terminal type is referred to as a low-capability terminal, sometimes also referred to as a Reduced capability UE, or referred to as a Redcap terminal, or referred to as NR-lite for short.

With the development of new generation of 5G mobile communication technology, sidelink communication is also widely applied. A sidelink function is introduced into the Redcap terminal, which is beneficial to expanding the usage scenario of the Redcap terminal. For example, the Redcap terminal can directly exchange information through the sidelink technology. In addition, the Redcap terminal uses the sidelink, which may also help the terminal to relay the information to the network device, so as to enhance coverage and achieve the purpose of power saving.

SUMMARY

According to a first aspect of the embodiments of the present disclosure, there is provided a method for sidelink bandwidth part configuration, performed by a first terminal, and including determining sidelink bandwidth part configuration information, where the sidelink bandwidth part configuration information is used for indicating a plurality of sidelink bandwidth parts.

According to a second aspect of the embodiments of the present disclosure, there is provided a method for sidelink bandwidth part configuration, performed by a second terminal, and including receiving capability information sent by a first terminal, where the capability information is used for indicating a capability of the first terminal, determining a sidelink bandwidth part satisfying the capability of the first terminal, and performing sidelink communication with the first terminal based on the sidelink bandwidth part satisfying the capability of the first terminal. The sidelink bandwidth part satisfying the capability of the first terminal is determined in a plurality of sidelink bandwidth parts by the first terminal.

According to a third aspect of the embodiments of the present disclosure, there is provided a method for sidelink bandwidth part configuration, performed by a network device, and including determining sidelink bandwidth part configuration information, where the sidelink bandwidth part configuration information is used for indicating a plurality of sidelink bandwidth parts; and, sending the sidelink bandwidth part configuration information.

It should be understood that the above general description and the following detailed description are exemplary and explanatory, and do not limit the present disclosure.

BRIEF DESCRIPTION OF THE DRAWINGS

The accompanying drawings, which are incorporated in and constitute a part of the description, illustrate embodiments consistent with the disclosure and together with the description serve to explain the principles of the disclosure.

FIG. 3 is a flowchart of a method for sidelink BWP configuration according to some embodiments of the present disclosure.

FIG. 4 is a flowchart of a method for sidelink BWP configuration according to some embodiments of the present disclosure.

FIG. 5 is a flowchart of a method for sidelink BWP configuration according to some embodiments of the present disclosure.

FIG. 12 is a block diagram of an apparatus for sidelink BWP configuration according to some embodiments of the present disclosure.

FIG. 13 is a block diagram of an apparatus for sidelink BWP configuration according to some embodiments of the present disclosure.

DETAILED DESCRIPTION OF THE PREFERRED EMBODIMENTS

Example embodiments will be described in detail herein, examples of which are illustrated in the accompanying drawings. The following description refers to the accompanying drawings in which the same numbers in different drawings represent the same or similar elements unless otherwise represented. The implementations described in the following example embodiments do not represent all implementations consistent with the present disclosure. By contrast, they are examples of apparatuses and methods consistent with some aspects of the present disclosure as detailed in the appended claims.

Figures 1, 2:
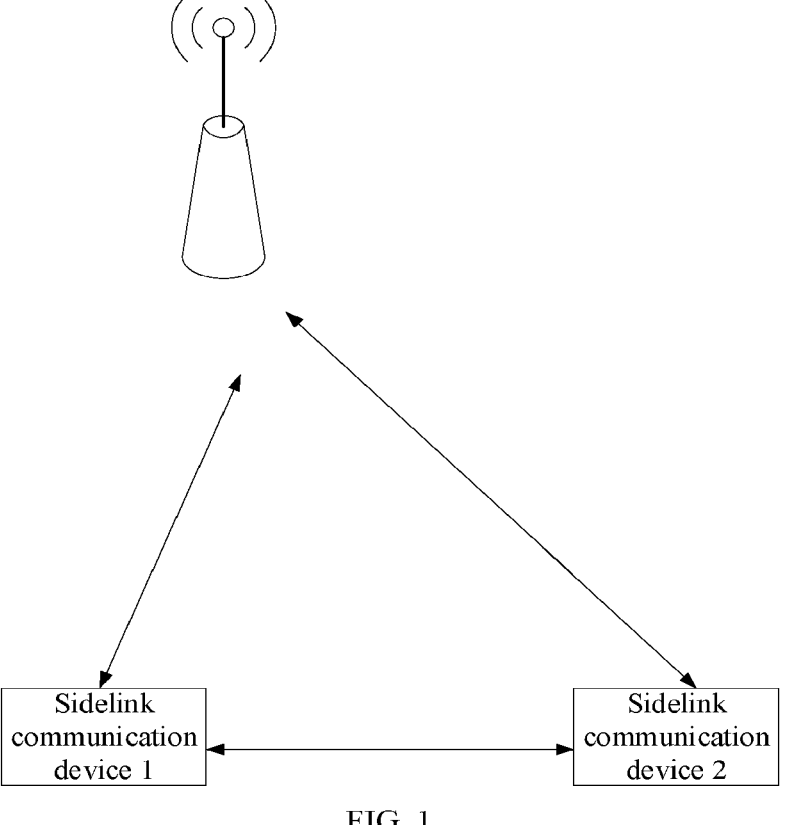
FIG. 1 is a schematic diagram of a wireless communication system according to some embodiments of the present disclosure.
FIG. 2 is a flowchart of a method for sidelink BWP configuration according to some embodiments of the present disclosure.

The method for sidelink bandwidth part configuration provided in the embodiments of the present disclosure can be applied to the wireless communication system shown in FIG. 1. Referring to FIG. 1, in a scenario that sidelink communication is performed between sidelink communication devices, a network device configures various transmission parameters used for data transmission for a sidelink communication device 1. The sidelink communication device 1 serves as a data sending end, and the sidelink communication device 2 serves as a data receiving end, both of which perform sidelink communication. The link for performing communication between the network device and the sidelink communication device is an uplink and downlink, and the link between a sidelink communication device and another sidelink communication device is a sidelink.

It may be understood that the wireless communication system shown in FIG. 1 is for illustrative description. The wireless communication system may further include other network devices, for example, may further include a core network device, a wireless relay device, a wireless backhaul device, and the like, which are not shown in FIG. 1. The embodiments of the present disclosure do not limit the number of network devices and the number of terminals included in the wireless communication system.

It can be further understood that, the wireless communication system according to the embodiments of the present disclosure is a network for providing a wireless communication function. The wireless communication system may adopt different communication technologies, such as Code Division Multiple Access (CDMA), Wideband Code Division Multiple Access (WCDMA), Time Division Multiple Access (TDMA), Frequency Division Multiple Access (FDMA), Orthogonal Frequency-Division Multiple Access (OFDMA), Single Carrier FDMA (SC-FDMA), Carrier Sense Multiple Access with Collision Avoidance. The network may be divided into a 2G (Generation) network, a 3G network, a 4G network, or a future evolution network (such as a 5G network) according to the capacity, the rate, the latency and other factors of different networks. 5G network may also be referred to as a New Radio (NR) network. For ease of description, sometimes the wireless communication network may be simply shorted as a network in the present disclosure.

Furthermore, the network device involved in the present disclosure may also be referred to as a wireless access network device. The wireless access network device may be: an access point (AP), a wireless relay node, a wireless backhaul node, a transmission point (TP), or a transmission and reception point (TRP), or the like in a base station, an evolved Node B (eNB), a home NodeB, and a Wireless Fidelity (WIFI) system; or, it may be a gNB in an NR system; or, it may also be a component or a part of a device that constitutes a base station, or the like. When it is a vehicle-to-everything (V2X) communication system, the network device may also be a vehicle-mounted device. It should be understood that, in the embodiments of the present disclosure, the specific technology and the specific device modality used for the network device are not limited.

Furthermore, the terminal involved in the present disclosure may also be referred to as a terminal device, a user equipment (UE), a mobile station (MS), a mobile terminal (MT), etc. It is a device for providing voice and/or data connectivity to a user. For example, the terminal may be a handheld device, a vehicle-mounted device, or the like that has a wireless connection function. Currently, some examples of the terminal are: a mobile phone, a pocket computer (PPC), a palm computer, a personal digital assistant (PDA), a notebook computer, a tablet computer, a wearable device, or a vehicle-mounted device. In addition, when it is a vehicle-to-everything (V2X) communication system, the terminal device may also be a vehicle-mounted device. It should be understood that, in the embodiments of the present disclosure, the specific technology and the specific device modality used for the terminal are not limited.

In the present disclosure, the communication scenario of sidelink communication between sidelink communication devices may also be a communication scenario of device to device (D2D). The sidelink communication devices for performing sidelink communication in the embodiments of the present disclosure may include various handheld devices having wireless communication functions, vehicle-mounted devices, wearable devices, computing devices, or other processing devices connected to the wireless modem, and various forms of user equipment (User Equipment, UE), mobile stations (MS), terminals, terminal equipment, or the like. For ease of description, the embodiments of the present disclosure are described below by taking that a sidelink communication device is a terminal as an example.

The terminal involved in the embodiments of the present disclosure may be understood as a new type of terminal designed in 5G NR: a low-capability terminal. The low-capability terminal is sometimes also referred to as a Reduced capability UE, or referred to as a Redcap terminal, or referred to as NR-lite for short. In this embodiment of the present disclosure, the new terminal is referred to as a Redcap terminal.

Similar to an Internet of Thing (IoT) device in Long Term Evolution (LTE), a 5G NR-lite usually needs to satisfy the following requirements:

Low cost and low complexity;

Coverage enhancement to some extent;

Power saving.

Since the current NR system is designed for high-speed, low-latency or other high-end terminals, the current design cannot satisfy the above requirements of the NR-Lite. Therefore, the current NR system needs to be modified to satisfy the requirements of the NR-Lite. For example, in order to satisfy the requirements of low cost, low complexity, or the like, radio frequency (RF) bandwidth of the NR-IoT may be limited. For example, the radio frequency (RF) bandwidth may be limited to 5 MHz or 10 MHz; or, the size of a buffer of the NR-lite may be limited, thus limiting the size of a transmission block received each time, etc. For power saving, the possible optimization direction is to simplify the communication process, reduce the number of times that the NR-lite terminal detects the downlink control channel, etc.

In the related art, a sidelink function is introduced into a Redcap terminal. However, in the current sidelink configuration, a sidelink BWP is configured uniformly. Among them, the bandwidth of the sidelink BWP may be greater than 20 MHz under FR1, and may be greater than 100 MHz under FR2. However, for a Redcap terminal, since its bandwidth capability is limited, the maximum is 20 MHz under FR1, and the maximum is 100 MHz under FR2. Therefore, limited by the bandwidth capability of the Redcap terminal, the unified configuration of the sidelink BWP will limit the communication performance of the Redcap terminal. Based on the current sidelink BWP configuration scheme, after the Redcap terminal is introduced, the possible sidelink BWP configuration schemes may be following two schemes:

Scheme 1: the bandwidth of the sidelink BWP is limited to be within the capability range of the Redcap terminal.

However, the bandwidth of the sidelink BWP being limited to be within the capability range of the Redcap terminal, may have a relatively larger effect on the communication system and the normal terminal (the Non-Redcap terminal). For example, the interaction rate and the flexibility of network configuration may be limited.

Scheme 2: the Sidelink BWP is flexibly configured.

However, flexibly configuring the sidelink BWP may result in that the bandwidth range of the flexibly configured sidelink BWP exceeds the capability of the Redcap terminal, so that the Redcap terminal may not monitor the entire sidelink BWP, which causes obstacles to the interaction of the Redcap terminal.

In view of the above, there is provided a method for sidelink BWP configuration according to an embodiment of the present disclosure. In the method for sidelink BWP configuration, a plurality of sidelink BWPs are determined, and a sidelink BWP is configured in a relatively unified manner; the possibility that the sidelink communication system is compatible with a Redcap terminal can be improved, thus improving the performance of the communication system.

FIG. 2 is a flowchart of a method for sidelink BWP configuration according to some embodiments of the present disclosure. The method for sidelink BWP configuration may be executed separately, or may be executed together with other embodiments of the present disclosure. As shown in FIG. 2, the method for sidelink BWP configuration is applied to a first terminal, and includes the following steps.

In step S11, sidelink BWP configuration information is determined, where the sidelink BWP configuration information is used for indicating a plurality of sidelink BWPs.

In the embodiments of the present disclosure, it is supported that a plurality of sidelink BWPs are configured in the sidelink communication system. The plurality of sidelink BWPs may have different bandwidth capabilities, so as to be adaptable for terminals of different capability types to perform sidelink communication based on the sidelink BWPs applicable to their own bandwidth capabilities. For example, a sidelink BWP capable of supporting the bandwidth capability of the Redcap terminal may be determined in the plurality of sidelink BWPs, so that the Redcap terminal can perform sidelink communication in the sidelink BWP applicable to the Redcap terminal.

In the method for sidelink BWP configuration provided in the embodiments of the present disclosure, different sidelink BWPs may be configured on based on different bandwidth capabilities of different types of terminals.

Among them, different types of terminals may have different capabilities. For example, the capability of the terminal may be the transmitting and receiving bandwidth, the number of transmitting and receiving antenna, the maximum bit number of the transmission block, the processing time latency, or the like. The capability of the terminal being different may be that one or more of the transmitting and receiving bandwidth, the number of transmitting and receiving antenna, the maximum bit number of the transmission block, and the processing time latency are different.

In the embodiments of the present disclosure, for ease of description, any two different types of terminals in different types of terminals may be referred to as a first type terminal and a second type terminal.

In the embodiments of the present disclosure, the first type terminal and the second type terminal may have different capabilities. For example, the capability of the terminal may be the transmitting and receiving bandwidth, the number of transmitting and receiving antenna, the maximum bit number of the transmission block, the processing time latency, or the like. The capability of the terminal being different may be that one or more of the transmitting and receiving bandwidth, the number of transmitting and receiving antenna, the maximum bit number of the transmission block, and the processing time latency are different.

Among them, a sidelink BWP configured for the first type terminal is referred to as a first sidelink BWP, and a sidelink BWP configured for a second type terminal is referred to as a second sidelink BWP.

In an embodiment, in the method for sidelink BWP configuration provided in the embodiments of the present disclosure, the plurality of sidelink BWPs indicated in the sidelink BWP configuration information include at least one first sidelink BWP. The first sidelink BWP belongs to a bandwidth capability range of a first type terminal. Among them, the bandwidth capability range of the first type terminal may be that, for example, the maximum is 20 MHz under FR1 and the maximum is 100 MHz under FR2.

FIG. 3 is a flowchart of a method for sidelink BWP configuration according to some embodiments of the present disclosure. The method for sidelink BWP configuration may be executed separately, or may be executed together with other embodiments of the present disclosure. As shown in FIG. 3, the method for sidelink BWP configuration is applied to a first terminal, and includes the following steps.

In step S21, sidelink BWP configuration information is determined, where the sidelink BWP configuration information is used for indicating a plurality of sidelink BWPs, the plurality of sidelink BWPs include at least one first sidelink BWP, and the first sidelink BWP belongs to a bandwidth capability range of the first type terminal.

In another embodiment, in the method for sidelink BWP configuration provided in the embodiments of the present disclosure, the plurality of sidelink BWPs indicated in the sidelink BWP configuration information include at least one second sidelink BWP. The second sidelink BWP belongs to a bandwidth capability range of a second type of terminal.

FIG. 4 is a flowchart of a method for sidelink BWP configuration according to some embodiments of the present disclosure. The method for sidelink BWP configuration may be executed separately, or may be executed together with other embodiments of the present disclosure. As shown in FIG. 4, the method for sidelink BWP configuration is applied to a first terminal, and includes the following steps.

In step S31, sidelink BWP configuration information is determined, where the sidelink BWP configuration information is used for indicating a plurality of sidelink BWPs, the plurality of sidelink BWPs include at least one second sidelink BWP, and the second sidelink BWP belongs to a bandwidth capability range of a second type terminal.

In the method for sidelink BWP configuration provided in the embodiments of the present disclosure, the first type terminal and the second type terminal have different capabilities, and the capability of the second type terminal is greater than the capability of the first type terminal. For example, the first type terminal may be a Redcap terminal, and the second type terminal may be an NR terminal (a Non-Redcap terminal).

In an example, the first type terminal is a Redcap terminal. In the embodiments of the present disclosure, the plurality of sidelink BWPs indicated in the sidelink BWP configuration information include at least one sidelink BWP within the bandwidth capability range of the Redcap terminal for use by the Redcap terminal.

In another example, the second type terminal is an NR terminal. In the embodiments of the present disclosure, the plurality of sidelink BWPs indicated in the sidelink BWP configuration information include at least one sidelink BWP within the bandwidth capability range of the NR terminal for use by the NR terminal.

In the method for sidelink BWP configuration provided in the embodiments of the present disclosure, the sidelink BWP may be configured based on system information. The terminal may determine the sidelink BWP configuration information based on the system information.

FIG. 5 is a flowchart of a method for sidelink BWP configuration according to some embodiments of the present disclosure. The method for sidelink BWP configuration may be executed separately, or may be executed together with other embodiments of the present disclosure. As shown in FIG. 5, the method for sidelink BWP configuration is applied to a first terminal, and includes the following steps.

In step S41, sidelink BWP configuration information is determined based on system information.

In the method for sidelink BWP configuration provided in the embodiments of the present disclosure, when the sidelink BWP is configured based on the system information, in an embodiment, configuration information of a plurality of sidelink BWPs is notified in the system information, that is, the system information is used for indicating the plurality of sidelink BWPs indicated by the sidelink BWP configuration information. The terminal may obtain, based on the system information, all sidelink BWPs in the plurality of sidelink BWPs indicated by the sidelink BWP configuration information.

In the method for sidelink BWP configuration provided in the embodiments of the present disclosure, when the sidelink BWP is configured based on the system information, in another embodiment, configuration information of a part of sidelink BWPs is notified in the system information, that is, the system information is used for indicating a part of sidelink BWPs in the plurality of sidelink BWPs indicated by the sidelink BWP configuration information. For ease of description below, the number of the part of sidelink BWPs indicated by the system information may be defined as a first number, and the first number is less than the total number of the plurality of sidelink BWPs.

In the method for sidelink BWP configuration provided in the embodiments of the present disclosure, the system information is used for indicating a first number of sidelink BWPs in the plurality of sidelink BWPs. Among them, the information of the remaining BWPs is derived according to a preset rule. The terminal determines, based on the preset rule, other sidelink BWPs in the plurality of sidelink BWPs other than the first number of sidelink BWPs.

Figure 6:
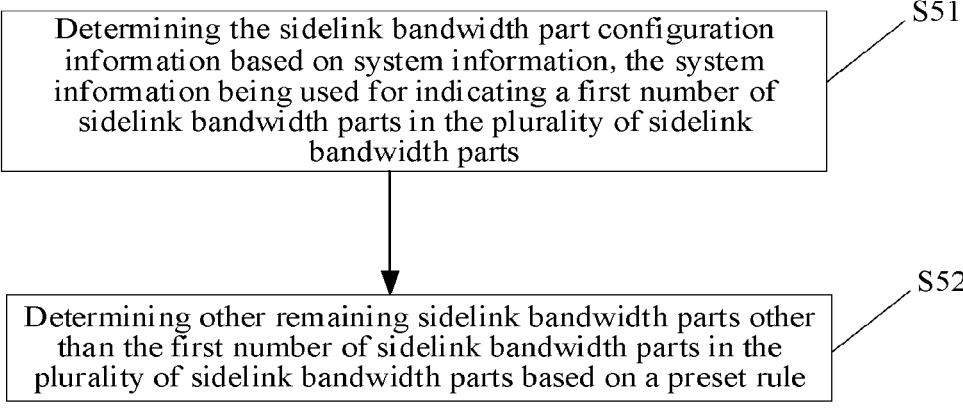
FIG. 6 is a flowchart of a method for sidelink BWP configuration according to some embodiments of the present disclosure.

FIG. 6 is a flowchart of a method for sidelink BWP configuration according to some embodiments of the present disclosure. As shown in FIG. 6, the method for sidelink BWP configuration is applied to a first terminal, and includes the following steps.

In step S51, sidelink BWP configuration information is determined based on system information, where the system information is used for indicating a first number of sidelink BWPs in a plurality of sidelink BWPs.

In step S52, a remaining sidelink BWP other than the first number of sidelink BWPs in the plurality of sidelink BWPs is determined based on a preset rule.

Among them, it may be understood that the execution steps of S51 and S52 in the embodiments of the present disclosure may be performed alternatively, or may be performed separately or together.

In the embodiments of the present disclosure, the preset rule for determining the remaining sidelink BWP may be predetermined. For example, it may be determined based on a frequency, or may be determined based on a sub-carrier spacing (SCS). For example, it is assumed that there are two sidelink BWPs. The system information may notify the configuration information of one sidelink BWP in the plurality of sidelink BWPs, and the preset rule for determining the other sidelink BWP is that the position is within 20 MHz near the center frequency of the configured sidelink BWP.

In the embodiments of the present disclosure, in response to the configuration of a plurality of sidelink BWPs, the terminal determines, in the plurality of sidelink BWPs, a sidelink BWP satisfying the capability of the terminal.

Figure 7:
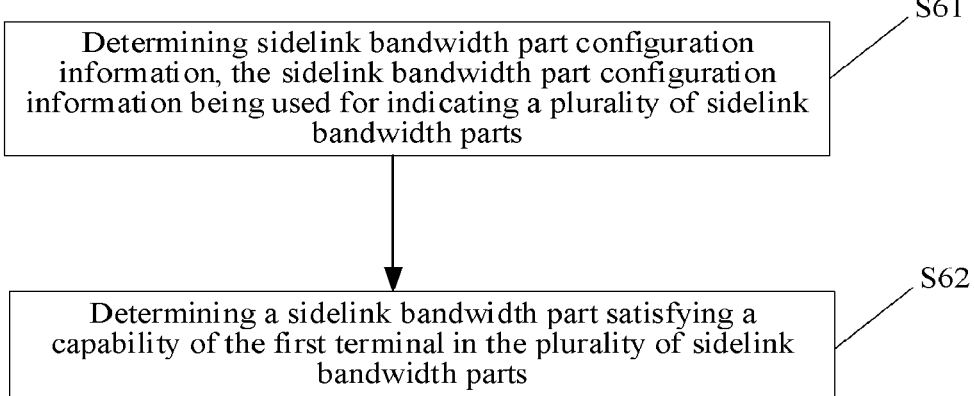
FIG. 7 is a flowchart of a method for sidelink BWP configuration according to some embodiments of the present disclosure.

FIG. 7 is a flowchart of a method for sidelink BWP configuration according to some embodiments of the present disclosure. As shown in FIG. 7, the method for sidelink BWP configuration is applied to a first terminal, and includes the following steps.

In step S61, sidelink BWP configuration information is determined, where the sidelink BWP configuration information is used for indicating a plurality of sidelink BWPs.

In step S62, in the plurality of sidelink BWPs, a sidelink BWP satisfying a capability of the first terminal is determined.

Among them, it may be understood that the execution steps of S61 and S62 in the embodiments of the present disclosure may be performed alternatively, or may be performed separately or together.

In the embodiments of the present disclosure, the terminal may determine a sidelink BWP satisfying the capability of the first terminal in the plurality of sidelink BWPs according to the configuration of the terminal or the preset information. For example, the Redcap terminal determine the sidelink BWP satisfying the capability of the Redcap terminal in the plurality of sidelink BWPs according to the configuration or according to the preset information.

In the embodiments of the present disclosure, after the sidelink BWP satisfying the capability of the first terminal is determined in the plurality of sidelink BWPs, sidelink communication with a second terminal may be performed based on the sidelink BWP satisfying the capability of the first terminal. For example, the first terminal is a Redcap terminal; after determining the sidelink BWP satisfying the capability of the Redcap terminal in the plurality of sidelink BWPs according to the configuration or according to the preset information, the Redcap terminal performs sidelink communication with a second terminal (another Redcap terminal or another normal terminal) in the sidelink BWP.

In the embodiments of the present disclosure, the first terminal may send capability information to the second terminal performing sidelink communication with the first terminal, and indicate the capability of the first terminal by the capability information, so that the first terminal and the second terminal perform sidelink communication based on the capability information.

Figure 8:
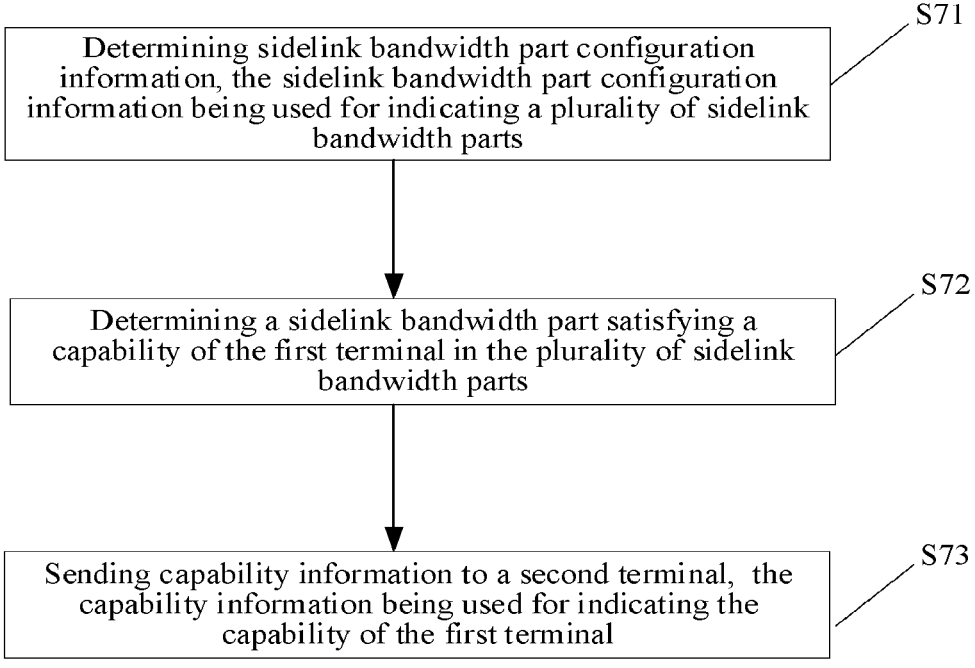
FIG. 8 is a flowchart of a method for sidelink BWP configuration according to some embodiments of the present disclosure.

FIG. 8 is a flowchart of a method for sidelink BWP configuration according to some embodiments of the present disclosure. As shown in FIG. 8, the method for sidelink BWP configuration is applied to a first terminal, and includes the following steps.

In step S71, sidelink BWP configuration information is determined, where the sidelink BWP configuration information is used for indicating a plurality of sidelink BWPs.

In step S72, a sidelink BWP satisfying a capability of a first terminal is determined in the plurality of sidelink BWPs.

In step S73, capability information is sent to a second terminal, where the capability information is used for indicating the capability of the first terminal.

Among them, it may be understood that the execution steps of S71, S72, and S73 in the embodiments of the present disclosure may be performed alternatively, or may be performed separately or together.

In an example, the first terminal is a Redcap terminal, and the Redcap terminal reports the capability of the Redcap terminal to a communication object. For example, the Redcap terminal reports the capability of the Redcap terminal to a Non-Redcap terminal.

In an embodiment of the present disclosure, in response to the capability of the second terminal being the same as the capability of the first terminal, sidelink communication is performed with the second terminal based on the sidelink BWP satisfying the capability of first terminal. Alternatively, in response to the capability of the second terminal being different from the capability of the first terminal, sidelink communication is performed with the second terminal based on the sidelink BWP satisfying the capability of the second terminal.

In an example, the first terminal is a Redcap terminal, and the Redcap terminal reports the capability of the Redcap terminal to a Non-Redcap terminal. The Non-Redcap terminal firstly determines the terminal type of the terminal interacting with the Non-Redcap terminal. If the type of the terminal interacting with the Non-Redcap terminal is a Redcap terminal, interaction is performed on the sidelink BWP supporting the capability of the Redcap terminal. If the type of the terminal interacting with the Non-Redcap terminal is a Non-Redcap, interaction may be performed on the sidelink BWP supporting the capability of the Non-Redcap terminal.

According to the method for sidelink BWP configuration provided in the embodiments of the present disclosure, by configuring a plurality of sidelink BWPs, a Redcap terminal may perform sidelink communication on a dedicated sidelink BWP applicable to the capability of the Redcap terminal, and interact with a communication object.

Based on the same concept, according to embodiments of the present disclosure, there is further provided a method for sidelink BWP configuration applied to a second terminal. Among them, the second terminal is a communication object performing sidelink communication with the first terminal involved in the above embodiments.

Figure 9:
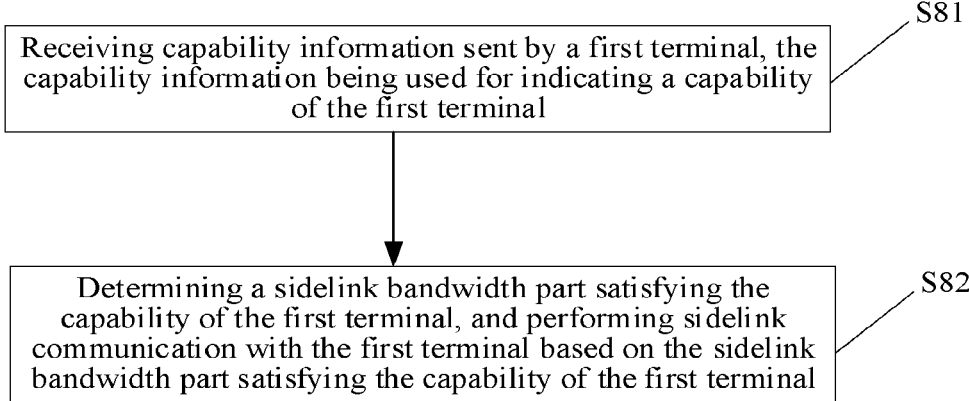
FIG. 9 is a flowchart of a method for sidelink BWP configuration according to some embodiments of the present disclosure.

FIG. 9 is a flowchart of a method for sidelink BWP configuration according to some embodiments of the present disclosure. As shown in FIG. 9, the method for sidelink BWP configuration is applied to a second terminal, and includes the following steps.

In step S81, capability information sent by a first terminal is received, where the capability information is used for indicating a capability of the first terminal.

In step S82, a sidelink BWP satisfying the capability of the first terminal is determined, and sidelink communication is performed with the first terminal based on the sidelink BWP satisfying the capability of the capability of the first terminal.

Among them, the sidelink BWP satisfying the capability of the first terminal is determined by the first terminal in a plurality of sidelink BWPs.

Among them, it may be understood that the execution steps of S81 and S82 in the embodiments of the present disclosure may be performed alternatively, or may be performed separately or together.

In the embodiments of the present disclosure, the sidelink BWP satisfying the capability of the first terminal may be determined in the plurality of sidelink BWPs according to the configuration of the terminal or the preset information. For example, the first terminal is a Redcap terminal, and the sidelink BWP satisfying the capability of the first terminal is determined according to the configuration of the Redcap terminal or according to the preset information.

In the embodiments of the present disclosure, after determining the sidelink BWP satisfying the capability of the first terminal in the plurality of sidelink BWPs, sidelink communication with a second terminal may be performed based on the sidelink BWP satisfying the capability of the first terminal. For example, the first terminal is a Redcap terminal; after determining the sidelink BWP satisfying the capability of the Redcap terminal in the plurality of sidelink BWPs according to the configuration of the Redcap terminal or according to the preset information, the second terminal performs sidelink communication with the Redcap terminal within the sidelink BWP.

In the embodiments of the present disclosure, the second terminal receives the capability information sent by the first terminal performing sidelink communication with the second terminal, and determines the capability of the first terminal through the capability information, so that the first terminal and the second terminal perform sidelink communication based on the capability information.

In some embodiments of the present disclosure, in response to the capability of the second terminal being the same as the capability of the first terminal, sidelink communication is performed with the second terminal based on the sidelink BWP satisfying the capability of the first terminal. Alternatively, in response to the capability of the second terminal being different from the capability of the first terminal, sidelink communication is performed with the second terminal based on the sidelink BWP satisfying the capability of the second terminal.

In an example, the second terminal receives the capability of the first terminal reported by the first terminal. If the second terminal is a Non-Redcap terminal, the Non-Redcap terminal firstly determines the terminal type of the terminal interacting with the Non-Redcap terminal; if the type of the terminal interacting with the Non-Redcap terminal is a Redcap terminal, interaction is performed on the sidelink BWP supporting the capability of the Redcap terminal; if the type of the terminal interacting with the Non-Redcap terminal is a Non-Redcap terminal, interaction may be performed on the sidelink BWP supporting the capability of the Non-Redcap terminal.

According to the method for sidelink BWP configuration provided in the embodiments of the present disclosure, between terminals performing sidelink communication, a sidelink BWP matching the capability of the terminal can be determined for performing sidelink communication based on a plurality of configured sidelink BWPs, thus improving the communication performance of the sidelink communication system.

Based on the same concept, according to embodiments of the present disclosure, there is further provided a method for sidelink BWP configuration applied to a network device.

Figure 10:
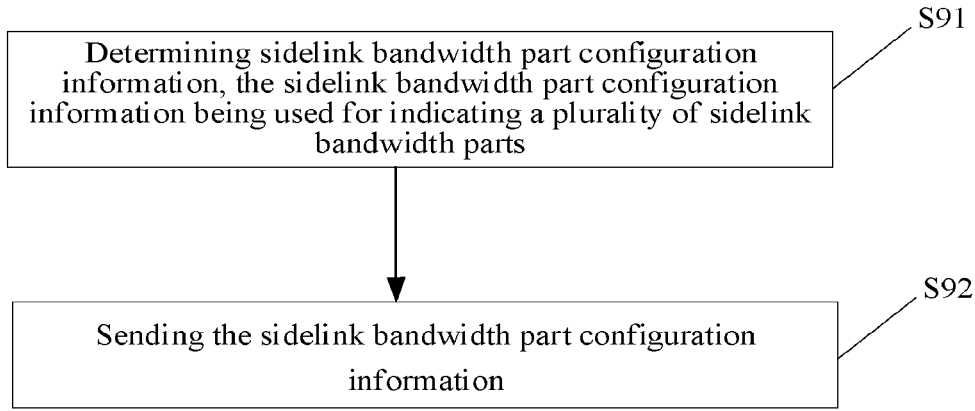
FIG. 10 is a flowchart of a method for sidelink BWP configuration according to some embodiments of the present disclosure.

FIG. 10 is a flowchart of a method for sidelink BWP configuration according to some embodiments of the present disclosure. As shown in FIG. 10, the method for sidelink BWP configuration is applied to a network device, and includes the following steps.

In step S91, sidelink BWP configuration information is determined, where the sidelink BWP configuration information is used for indicating a plurality of sidelink BWPs.

In step S92, the sidelink BWP configuration information is sent.

Among them, it may be understood that the execution steps of S91 and S92 in the embodiments of the present disclosure may be performed alternatively, or may be performed separately or together.

In the embodiments of the present disclosure, a plurality of sidelink BWPs are configured in the sidelink communication system, and the plurality of sidelink BWPs may have different bandwidth capabilities, so as to be adaptable for terminals of different capability types to perform sidelink communication based on the sidelink BWPs applicable to their own bandwidth capabilities. For example, a sidelink BWP capable of supporting the bandwidth capability of the Redcap terminal may be determined in the plurality of sidelink BWPs, so that the Redcap terminal can perform sidelink communication in the sidelink BWP applicable to the Redcap terminal.

In some embodiments, the plurality of sidelink BWPs include at least one first sidelink BWP, and the first sidelink BWP belongs to a bandwidth capability range of a first type terminal.

In an example, the first type terminal is a Redcap terminal. In the embodiments of the present disclosure, it is supported that a plurality of sidelink BWPs are configured in the sidelink communication system, and at least one sidelink BWP in the sidelink communication system belongs to a bandwidth capability range of the Redcap terminal; for example, the maximum is 20 MHz under FR1, and the maximum is 100 MHz under FR2. Moreover, the sidelink BWP belonging to the bandwidth capability range of the Redcap terminal is for use by the Redcap terminal, thus improving the communication performance of the Redcap terminal.

In some embodiments, the plurality of sidelink BWPs include at least one second sidelink BWP, and the second sidelink BWP belongs to a bandwidth capability range of a second type terminal. Among them, the capability of the second type terminal is greater than the capability of the first type terminal.

In an example, the second type terminal is a Non-Redcap terminal. In the embodiments of the present disclosure, it is supported that a plurality of sidelink BWPs are configured in the sidelink communication system, at least one sidelink BWP in the sidelink communication system belongs to the bandwidth capability range of the Redcap terminal, and at least one sidelink BWP belongs to the bandwidth capability range of the Non-Redcap terminal. The sidelink BWP belonging to the bandwidth capability range of the Redcap terminal is for use by the Redcap terminal, and the sidelink BWP belonging to the bandwidth capability range of the Non-Redcap terminal is for use by the Non-Redcap terminal, thus improving the type of the terminal applicable to the sidelink communication system and improving the communication performance.

In some embodiments, the network device may send the sidelink BWP configuration information based on system information.

In the embodiments of the present disclosure, when configuration information indicating the plurality of sidelink BWPs is configured through the system information; in some embodiments, the system information is used for indicating the plurality of sidelink BWPs. That is, configuration information of the plurality of sidelink BWPs is notified in the system information. In another embodiment, the system information is used for indicating a first number of sidelink BWPs in the plurality of sidelink BWPs, and the first number is less than the total number of the plurality of sidelink BWPs. For example, configuration information of a part of sidelink BWPs is notified in the system information, and information of the remaining BWP is derived according to a preset rule. For example, it is assumed that there are two sidelink BWPs. The system information notifies the configuration information of one BWP, and the position of the other BWP is within 20 MHz near the center frequency of the configured BWP.

In the embodiments of the present disclosure, the network device configures a plurality of sidelink BWPs. The Redcap terminal determines a sidelink BWP satisfying the capability of the Redcap terminal in the plurality of sidelink BWPs according to the configuration or according to the preset information. The Redcap terminal communicates with other Redcap terminals or other normal terminals in the sidelink BWP.

The Redcap terminal reports the terminal capability to the communication object, for example, reports the terminal capability to a Non-Redcap terminal.

In the embodiments of the present disclosure, the Non-Redcap terminal firstly determines the terminal type of the terminal interacting with the Non-Redcap terminal. If the type of the terminal interacting with the Non-Redcap terminal is a Redcap terminal, interaction is performed on the BWP supporting the capability of the Redcap terminal. Otherwise, interaction may be performed on the BWP supporting the capability of the Non-Redcap terminal.

According to the method for sidelink BWP configuration provided in the embodiments of the present disclosure, by configuring a plurality of sidelink BWPs, a Redcap terminal may perform sidelink communication on a dedicated sidelink BWP applicable to the capability of the Redcap terminal, and interact with a communication object.

The method for sidelink BWP configuration provided in the embodiments of the present disclosure can be applicable to a scenario of performing sidelink communication interaction between terminals and performing sidelink BWP configuration, and is also applicable to a scenario of performing interaction between a terminal and a network device to implement sidelink BWP configuration. Among them, the functions implemented by the terminal and the network device involved in the specific implementation process may refer to the related description involved in the foregoing embodiments, and will not be described in detail here.

It should be noted that those skilled in the art may understand that various embodiments/implementation involved in the embodiments of the present disclosure may be used in conjunction with the foregoing embodiments, or may be used independently. Whether used alone or in conjunction with the foregoing embodiments, the implementation principles are similar. In the embodiments of the present disclosure, some embodiments are described as implementations being used together. Those skilled in the art may understand that such an example is not limited to the embodiments of the present disclosure.

Based on the same concept, there is further provided an apparatus for sidelink BWP configuration according to some embodiments of the present disclosure.

It may be understood that, in order to implement the foregoing functions, the apparatus for sidelink BWP configuration provided in the embodiments of the present disclosure includes corresponding hardware structures and/or software modules for performing various functions. In combination with the units and algorithm steps of the various examples disclosed in the embodiments of the present disclosure, the embodiments of the present disclosure can be implemented in the form of a hardware or a combination of a hardware and a computer software. Whether a function is implemented by a hardware or a computer software driving a hardware depends on the specific application and design constraint conditions of the technical solution. Those skilled in the art may use different methods to implement the described functions for each specific application, but it should not be considered that such implementation goes beyond the scope of the technical solutions of the embodiments of the present disclosure.

Figure 11:
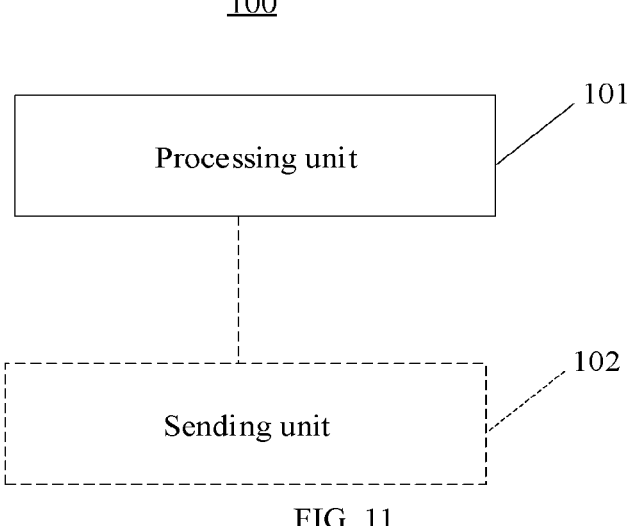
FIG. 11 is a block diagram of an apparatus for sidelink BWP configuration according to some embodiments of the present disclosure.

FIG. 11 is a block diagram of an apparatus for sidelink BWP configuration according to some embodiments of the present disclosure. Referring to FIG. 11, the apparatus for sidelink BWP configuration 100 is applied to a first terminal, and the apparatus for sidelink BWP configuration 100 includes a processing unit 101.

The processing unit 101 is configured to determine sidelink BWP configuration information, where the sidelink BWP configuration information is used for indicating a plurality of sidelink BWPs.

In some embodiments, the plurality of sidelink BWPs include at least one first sidelink BWP, and the first sidelink BWP belongs to a bandwidth capability range of a first type terminal.

In some embodiments, the plurality of sidelink BWPs include at least one second sidelink BWP, and the second sidelink BWP belongs to a bandwidth capability range of a second type terminal. The capability of the second type terminal is greater than the capability of the first type terminal.

In some embodiments, the processing unit 101 determines the sidelink BWP configuration information based on system information.

In some embodiments, the system information is used for indicating the plurality of sidelink BWPs.

In some embodiments, the system information is used for indicating a first number of sidelink BWPs in the plurality of sidelink BWPs, and the first number is less than the total number of the plurality of sidelink BWPs. The processing unit 101 is further configured to determine, based on a preset rule, other sidelink BWPs other than the first number of sidelink BWPs in the plurality of sidelink bandwidth parts.

In some embodiments, the processing unit 101 is further configured to determine, in the plurality of sidelink BWPs, a sidelink BWP satisfying a capability of the first terminal.

In some embodiments, the apparatus for sidelink BWP configuration 100 further includes a sending unit 102, and the sending unit 102 is further configured to send capability information to a second terminal, where the capability information is used for indicating the capability of the first terminal.

In some embodiments, in response to the capability of the second terminal being the same as the capability of the first terminal, the sending unit 102 performs sidelink communication with the second terminal based on the sidelink BWP satisfying the capability of the first terminal. Alternatively, in response to the capability of the second terminal being different from the capability of the first terminal, the sending unit 102 performs sidelink communication with the second terminal based on the sidelink BWP satisfying the capability of the second terminal.

FIG. 12 is a block diagram of an apparatus for sidelink BWP configuration according to some embodiments of the present disclosure. Referring to FIG. 12, the apparatus for sidelink BWP configuration 200 is applied to a second terminal, and the apparatus for sidelink BWP configuration 200 includes a receiving unit 201 and a processing unit 202.

The receiving unit 201 is configured to receive capability information sent by a first terminal, where the capability information is used for indicating a capability of the first terminal. The processing unit 202 is configured to determine a sidelink BWP satisfying the capability of the first terminal, perform sidelink communication with the first terminal based on the sidelink BWP satisfying the capability of the first terminal. The sidelink BWP satisfying the capability of the first terminal is determined by the first terminal in the plurality of sidelink BWPs.

FIG. 13 is a block diagram of an apparatus for sidelink BWP configuration according to some embodiments of the present disclosure. Referring to FIG. 13, the apparatus for sidelink BWP configuration 300 is applied to a network device, and the apparatus for sidelink BWP configuration 300 includes a processing unit 301 and a sending unit 302.

The processing unit 301 is configured to determine sidelink BWP configuration information, where the sidelink BWP configuration information is used for indicating a plurality of sidelink BWPs. The sending unit 302 is configured to send the sidelink BWP configuration information.

In some embodiments, the plurality of sidelink BWPs include at least one first sidelink BWP, and the first sidelink BWP belongs to a bandwidth capability range of a first type terminal.

In some embodiments, the plurality of sidelink BWPs include at least one second sidelink BWP, and the second sidelink BWP belongs to a bandwidth capability range of a second type terminal. The capability of the second type terminal is greater than the capability of the first type terminal.

In some embodiments, the sending unit 302 sends the sidelink BWP configuration information based on system information.

In some embodiments, the system information is used for indicating the plurality of sidelink BWPs.

In some embodiments, the system information is used for indicating a first number of sidelink BWPs in the plurality of sidelink BWPs, and the first number is less than the total number of the plurality of sidelink BWPs.

With regard to the apparatus in the above embodiments, the specific manner in which each module performs an operation has been described in detail in the embodiments related to the method, and will not be described in detail here.

Figure 14:
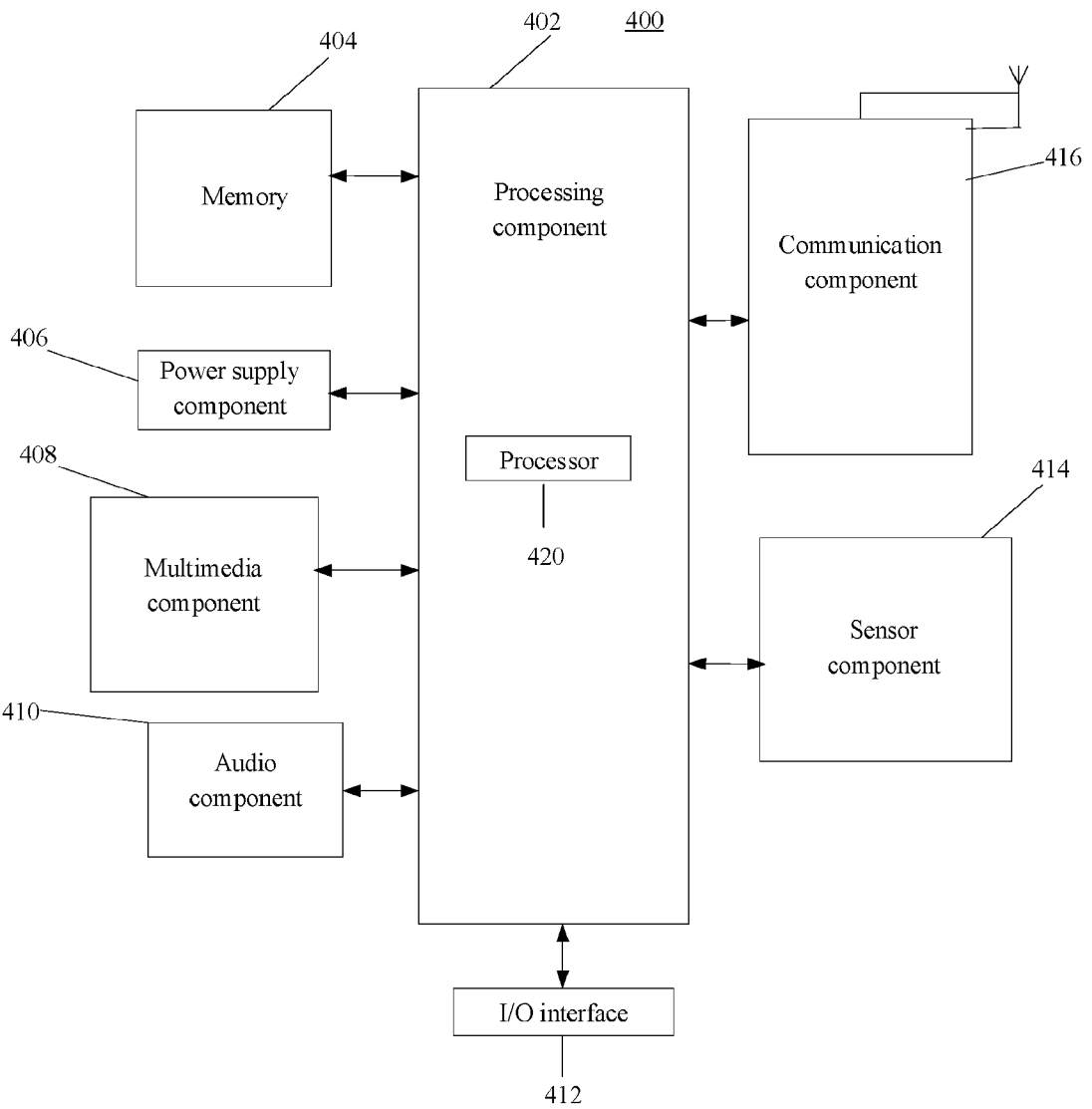
FIG. 14 is a block diagram of an apparatus for sidelink BWP configuration according to some embodiments of the present disclosure.

FIG. 14 is a block diagram of an apparatus for sidelink BWP configuration according to some embodiments of the present disclosure. For example, the apparatus 400 may be a mobile phone, a computer, a digital broadcast terminal, a messaging device, a game console, a tablet device, a medical device, a fitness device, a personal digital assistant, etc.

Referring to FIG. 14, the apparatus 400 may include one or more of the following components: a processing component 402, a memory 404, a power supply component 406, a multimedia component 408, an audio component 410, an input/output (I/O) interface 412, a sensor component 414, and a communication component 416.

The processing component 402 generally controls the overall operation of the apparatus 400, such as operations associated with display, telephone calls, data communications, camera operations, and recording operations. The processing component 402 may include one or more processors 420 to execute instructions to complete all or some of the steps of the above method. In addition, the processing component 402 may include one or more modules to facilitate interaction between the processing component 402 and other components. For example, the processing component 402 may include a multimedia module to facilitate interaction between the multimedia component 408 and the processing component 402.

The memory 404 is configured to store various types of data to support operation at the apparatus 400. Examples of such data include instructions for any application or method operating on the apparatus 400, contact data, phonebook data, messages, pictures, videos, and the like. The memory 404 may be implemented by any type of volatile or nonvolatile storage device or a combination of them, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic disk, or an optical disk.

The power supply component 406 provides electrical power to various components of the apparatus 400. The power supply component 406 may include a power management system, one or more power sources, and other components associated with generating, managing, and distributing power for the apparatus 400.

The multimedia component 408 includes a screen providing an output interface between the apparatus 400 and a user. In some embodiments, the screen may include a liquid crystal display (LCD) and a touch panel (TP). If the screen includes a touch panel, the screen may be implemented as a touch screen to receive an input signal from a user. The touch panel includes one or more touch sensors to sense touches, sliding, and gestures on the touch panel. The touch sensor may not only sense a boundary of a touch or sliding action, but also detect a duration and pressure associated with the touch or sliding action. In some embodiments, the multimedia component 408 includes a front-facing camera and/or a rear-facing camera. When the apparatus 400 is in an operation mode, such as a photographing mode or a video mode, the front-facing camera and/or the rear-facing camera may receive external multimedia data. Each of the front camera and the rear camera may be a fixed optical lens system or have a focal length and an optical zoom capability.

The audio component 410 is configured to output and/or input an audio signal. For example, the audio component

410 includes a microphone (MIC) configured to receive an external audio signal when the apparatus 400 is in an operating mode, such as a call mode, a recording mode, and a speech recognition mode. The received audio signal may be further stored in the memory 404 or transmitted via the communication component 416. In some embodiments, the audio component 410 further includes a speaker configured to output an audio signal.

The I/O interface 412 provides an interface between the processing component 402 and a peripheral interface module, and the peripheral interface module may be a keyboard, a click wheel, a button, or the like. The button may include, but is not limited to, a home button, a volume button, a start button, and a lock button.

The sensor component 414 includes one or more sensors for providing status assessments of various aspects for the apparatus 400. For example, the sensor component 414 may detect the open/closed state of the apparatus 400, and the relative positioning of the components, such as the display and the keypad of the apparatus 400. The sensor component 414 may also detect the position change of the apparatus 400 or a component of the apparatus 400, the presence or absence of the user's contact with the apparatus 400, orientation or acceleration/deceleration of the apparatus 400, and the temperature change of the apparatus 400. The sensor component 414 may include a proximity sensor configured to detect the presence of nearby objects without any physical contact. The sensor component 414 may also include an optical sensor, such as a CMOS or CCD image sensor, for use in an imaging application. In some embodiments, the sensor component 414 may further include an acceleration sensor, a gyroscope sensor, a magnetic sensor, a pressure sensor, or a temperature sensor.

The communication component 416 is configured to facilitate wired or wireless communication between the apparatus 400 and other devices. The apparatus 400 may access a wireless network based on any communication standard, such as WiFi, 2G, or 3G, or a combination of them. In some embodiments, the communication component 416 receives broadcast signals or broadcast related information from an external broadcast management system via a broadcast channel. In some embodiments, the communication component 416 further includes a near field communication (NFC) module to facilitate short-range communication. For example, the NFC module may be implemented based on a radio frequency identification (RFID) technology, an infrared data association (IrDA) technology, an ultra-wideband (UWB) technology, a Bluetooth (BT) technology, and other technologies.

In some embodiments, the apparatus 400 may be implemented by one or more application specific integrated circuits (ASICs), digital signal processors (DSPs), digital signal processing devices (DSPDs), programmable logic devices (PLDs), field programmable gate arrays (FPGAs), controllers, microcontrollers, microprocessors, or other electronic components for performing the methods described above.

In some embodiments, there is further provided a nontransitory computer-readable storage medium including instructions, for example, the memory 404 including instructions. The instructions may be executed by the processor 420 of the apparatus 400 to complete the methods described above. For example, the non-transitory computer-readable storage medium may be a ROM, a random access memory (RAM), a CD-ROM, a magnetic tape, a floppy disk, an optical data storage device, etc.

Figure 15:
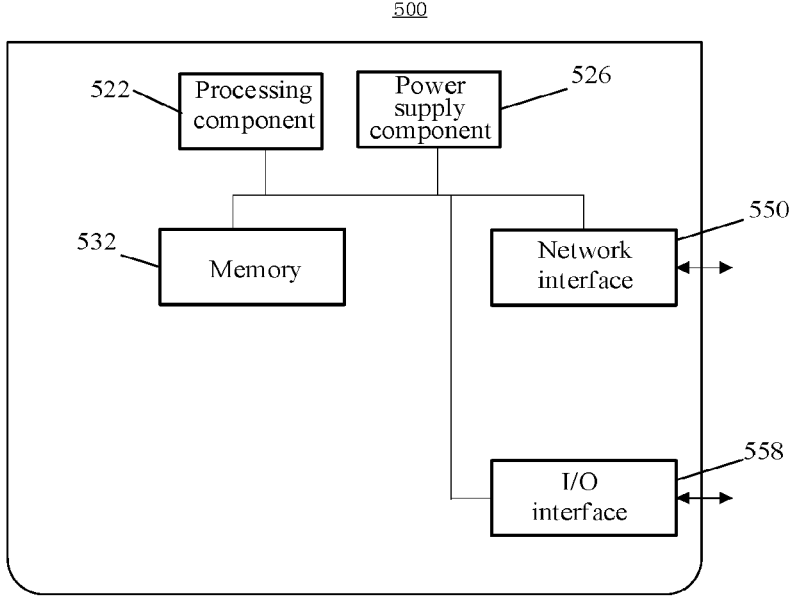
FIG. 15 is a block diagram of an apparatus for sidelink BWP configuration according to some embodiments of the present disclosure.

FIG. 15 is a block diagram of an apparatus for sidelink BWP configuration according to some embodiments. For example, the apparatus 500 may be provided as a server. Referring to FIG. 15, the apparatus 500 includes a processing component 522 that further includes one or more processors, and memory resources represented by the memory 532 for storing instructions executable by the processing component 522, such as an application. The application stored in the memory 532 may include one or more modules each corresponding to a set of instructions. In addition, the processing component 522 is configured to execute the instructions to perform the methods described above.

The apparatus 500 may also include a power supply component 526 configured to perform power management of the apparatus 500, a wired or wireless network interface 550 configured to connect the apparatus 500 to a network, and an input/output (I/O) interface 558. The apparatus 500 may operate based on an operating system stored in the memory 532, such as Windows Server™, Mac OS X™, Unix™, Linux™, FreeBSD™, or the like.

In some embodiments, there is further provided a non-transitory computer-readable storage medium including instructions, for example, a memory 532 including instructions. The instructions may be executed by the processing component 522 of the apparatus 500 to complete the methods described above. For example, the non-transitory computer-readable storage medium may be a ROM, a random access memory (RAM), a CD-ROM, a magnetic tape, a floppy disk, an optical data storage device, etc.

In order to overcome the problems existing in the related art, the present disclosure provides a method and apparatus for sidelink bandwidth part configuration, and a non-transitory computer-readable storage medium.

According to a first aspect of the embodiments of the present disclosure, there is provided a method for sidelink bandwidth part configuration, performed by a first terminal, and including determining sidelink bandwidth part configuration information, where the sidelink bandwidth part configuration information is used for indicating a plurality of sidelink bandwidth parts.

In some embodiments, the plurality of sidelink bandwidth parts include at least one first sidelink bandwidth part, and the first sidelink bandwidth part belongs to a bandwidth capability range of a first type terminal.

In some embodiments, the plurality of sidelink bandwidth parts include at least one second sidelink bandwidth part, and the second sidelink bandwidth part belongs to a bandwidth capability range of a second type terminal, and a capability of the second type terminal is greater than a capability of the first type terminal.

In some embodiments, determining the sidelink bandwidth part configuration information includes: determining the sidelink bandwidth part configuration information based on system information.

In some embodiments, the system information is used for indicating the plurality of sidelink bandwidth parts.

In some embodiments, the system information is used for indicating a first number of sidelink bandwidth parts in the plurality of sidelink bandwidth parts, and the first number is smaller than a total number of the plurality of sidelink bandwidth parts; and the method for sidelink bandwidth part configuration further includes: determining other sidelink bandwidth parts other than the first number of sidelink bandwidth parts in the plurality of sidelink bandwidth parts based on a preset rule.

In some embodiments, the method for sidelink bandwidth part configuration further includes: determining a sidelink bandwidth part satisfying a capability of the first terminal in the plurality of sidelink bandwidth parts.

In some embodiments, the method for sidelink bandwidth part configuration further includes: sending capability information to a second terminal, where the capability information is used for indicating the capability of the first terminal.

In some embodiments, the method for sidelink bandwidth part configuration further includes performing, in response to a capability of the second terminal being the same as the capability of the first terminal, sidelink communication with the second terminal based on the sidelink bandwidth part satisfying the capability of the first terminal, or performing, in response to the capability of the second terminal being different from the capability of the first terminal, sidelink communication with the second terminal based on a sidelink bandwidth part satisfying the capability of the second terminal.

According to a second aspect of the embodiments of the present disclosure, there is provided a method for sidelink bandwidth part configuration, performed by a second terminal, and including receiving capability information sent by a first terminal, where the capability information is used for indicating a capability of the first terminal, determining a sidelink bandwidth part satisfying the capability of the first terminal, and performing sidelink communication with the first terminal based on the sidelink bandwidth part satisfying the capability of the first terminal. The sidelink bandwidth part satisfying the capability of the first terminal is determined in a plurality of sidelink bandwidth parts by the first terminal.

According to a third aspect of the embodiments of the present disclosure, there is provided a method for sidelink bandwidth part configuration, performed by a network device, and including determining sidelink bandwidth part configuration information, where the sidelink bandwidth part configuration information is used for indicating a plurality of sidelink bandwidth parts, and sending the sidelink bandwidth part configuration information.

In some embodiments, the plurality of sidelink bandwidth parts include at least one first sidelink bandwidth part, and the first sidelink bandwidth part belongs to a bandwidth capability range of a first type terminal.

In some embodiments, the plurality of sidelink bandwidth parts include at least one second sidelink bandwidth part, the second sidelink bandwidth part belongs to a bandwidth capability range of a second type terminal, and, a capability of the second type terminal is greater than a capability of the first type terminal.

In some embodiments, sending the sidelink bandwidth part configuration information includes sending the sidelink bandwidth part configuration information based on system information.

In some embodiments, the system information is used for indicating the plurality of sidelink bandwidth parts.

In some embodiments, the system information is used for indicating a first number of sidelink bandwidth parts in the plurality of sidelink bandwidth parts, and the first number is less than a total number of the plurality of sidelink bandwidth parts.

According to a fourth aspect of the embodiments of the present disclosure, there is provided an apparatus for sidelink bandwidth part configuration, applied to a first terminal, and including a processing unit, configured to determine sidelink bandwidth part configuration information. The sidelink bandwidth part configuration information is used for indicating a plurality of sidelink bandwidth parts.

In some embodiments, the plurality of sidelink bandwidth parts include at least one first sidelink bandwidth part, and the first sidelink bandwidth part belongs to a bandwidth capability range of a first type terminal.

In some embodiments, the plurality of sidelink bandwidth parts include at least one second sidelink bandwidth part, and the second sidelink bandwidth part belongs to a bandwidth capability range of a second type terminal, and a capability of the second type terminal is greater than a capability of the first type terminal.

In some embodiments, the processing unit determines the sidelink bandwidth part configuration information based on system information.

In some embodiments, the system information is used for indicating the plurality of sidelink bandwidth parts.

In some embodiments, the system information is used for indicating a first number of sidelink bandwidth parts in the plurality of sidelink bandwidth parts, and the first number is smaller than a total number of the plurality of sidelink bandwidth parts; and the processing unit is further configured to determine other sidelink bandwidth parts other than the first number of sidelink bandwidth parts in the plurality of sidelink bandwidth parts based on a preset rule.

In some embodiments, the processing unit is further configured to determine a sidelink bandwidth part satisfying a capability of the first terminal in the plurality of sidelink bandwidth parts.

In some embodiments, the processing unit is further configured to send capability information to a second terminal, where the capability information is used for indicating the capability of the first terminal.

In some embodiments, in response to a capability of the second terminal being the same as the capability of the first terminal, the processing unit is configured to perform sidelink communication with the second terminal based on the sidelink bandwidth part satisfying the capability of the first terminal, or, in response to the capability of the second terminal being different from the capability of the first terminal, the processing unit is configured to perform sidelink communication with the second terminal based on a sidelink bandwidth part satisfying the capability of the second terminal.

According to a fifth aspect of the embodiments of the present disclosure, there is provided an apparatus for sidelink bandwidth part configuration, applied to a second terminal, and including a receiving unit, configured to receive capability information sent by a first terminal, where the capability information is used for indicating a capability of the first terminal, and a processing unit, configured to determine a sidelink bandwidth part satisfying the capability of the first terminal, and perform sidelink communication with the first terminal based on the sidelink bandwidth part satisfying the capability of the first terminal, where the sidelink bandwidth part satisfying the capability of first terminal is determined in a plurality of sidelink bandwidth parts by the first terminal.

According to a sixth aspect of the embodiments of the present disclosure, there is provided an apparatus for sidelink bandwidth part configuration, applied to a network device, and including a processing unit, configured to determine sidelink bandwidth part configuration information, where the sidelink bandwidth part configuration information is used for indicating a plurality of sidelink bandwidth parts, and a sending unit, configured to send the sidelink bandwidth part configuration information.

In some embodiments, the plurality of sidelink bandwidth parts include at least one first sidelink bandwidth part, and the first sidelink bandwidth part belongs to a bandwidth capability range of a first type terminal.

In some embodiments, the plurality of sidelink bandwidth parts include at least one second sidelink bandwidth part, the second sidelink bandwidth part belongs to a bandwidth capability range of a second type terminal, and, a capability of the second type terminal is greater than a capability of the first type terminal.

In some embodiments, the sending unit sends the sidelink bandwidth part configuration information based on system information.

In some embodiments, the system information is used for indicating the plurality of sidelink bandwidth parts.

In some embodiments, the system information is used for indicating a first number of sidelink bandwidth parts in the plurality of sidelink bandwidth parts, and the first number is less than a total number of the plurality of sidelink bandwidth parts.

According to a seventh aspect of the embodiments of the present disclosure, there is provided an apparatus for sidelink bandwidth part configuration, including a processor and a memory that is configured to store an instruction executable by the processor. The processor is configured to perform the method for sidelink bandwidth part configuration according to the first aspect or any embodiment of the first aspect.

According to an eighth aspect of the embodiments of the present disclosure, there is provided an apparatus for sidelink bandwidth part configuration, including a processor and a memory that is configured to store an instruction executable by the processor. The processor is configured to perform the method for sidelink bandwidth part configuration according to the second aspect.

According to a ninth aspect of the embodiments of the present disclosure, there is provided an apparatus for sidelink bandwidth part configuration, including a processor and a memory that is configured to store an instruction executable by the processor. The processor is configured to perform the method for sidelink bandwidth part configuration according to the third aspect or any embodiment of the third aspect.

According to a tenth aspect of the embodiments of the present disclosure, there is provided a non-transitory computer-readable storage medium. When an instruction in the storage medium is executed by a processor of a terminal, the terminal is enabled to perform the method for sidelink bandwidth part configuration according to the first aspect or any embodiment of the first aspect.

According to an eleventh aspect of the embodiments of the present disclosure, there is provided a non-transitory computer-readable storage medium. When an instruction in the storage medium is executed by a processor of a terminal, the terminal is enabled to perform the method for sidelink bandwidth part configuration according to the second aspect.

According to a twelfth aspect of the embodiments of the present disclosure, there is provided a non-transitory computer-readable storage medium. When an instruction in the storage medium is executed by a processor of a network device, the network device is enabled to perform the method for sidelink bandwidth part configuration according to the third aspect or any embodiment of the third aspect.

The technical solutions provided in the embodiments of the present disclosure may include the following beneficial effects: by determining a plurality of sidelink bandwidth parts and configuring a sidelink bandwidth part in a relatively unified manner, it can improve the possibility that the sidelink communication system is compatible with a Redcap terminal, thus improving the performance of the communication system.

It can be further understood that, in the present disclosure means two or more, and other quantifiers are similar to "a plurality of". "And/or" describes the association relationship of associated objects, indicating that there may be three types of relationships; for example, A and/or B may indicate that A exists alone, A and B exist at the same time, and B exists alone. The character "/" generally indicates that the associated objects before and after are in an "or" relationship. The singular forms "a", "said" and "the" are also intended to include plural forms unless the context clearly indicates other meanings.

It is further understood that the terms "first", "second" and the like are used to describe various information, but the information should not be limited to these terms. These terms are used to distinguish the same type of information from each other, and do not represent a specific order or importance. In fact, expressions such as "first" and "second" may be used interchangeably. For example, without departing from the scope of the present disclosure, the first information may also be referred to as second information, similarly, the second information may also be referred to as first information.

It is further understood that although the operations are described in the drawings in a specific order, it should not be understood that it is needed to perform the operations according to the specific order or the serial order as shown, or it is needed to perform all of the illustrated operations to obtain a desired result. In particular environments, multitasking and parallel processing may be advantageous.

Other embodiments of the present disclosure will be apparent to those skilled in the art from consideration of the specification and practice of the present disclosure. The present disclosure is intended to cover any variations, uses, or adaptations of the present disclosure, which follow the general principles of the present disclosure and include common general knowledge or conventional technical means in the art not disclosed in the present disclosure. The specification and embodiments may be considered as examples, with a true scope and spirit of the present disclosure being indicated by the following claims.

It should be understood that the present disclosure is not limited to the precise construction that has been described above and illustrated in the accompanying drawings, and that various modifications and changes may be made without departing from the scope of the present disclosure. The scope of the present disclosure may be limited by the appended claims.

What is claimed is:

1. A method for sidelink bandwidth part configuration, performed by a first terminal, and comprising:

receiving system information sent by a network device;

determining sidelink bandwidth part (BWP) configuration information based on the system information, wherein the sidelink BWP configuration information is used for indicating a plurality of sidelink BWPs, the system information is used for indicating a first number of sidelink BWPs in the plurality of sidelink BWPs, the first number is less than the total number of the plurality of sidelink BWPs, and a remaining sidelink BWP other than the first number of sidelink BWPs in the plurality of sidelink BWPs is located within 20 MHz near a center frequency of the sidelink BWPs configured based on the system information; and wherein the plurality of sidelink BWPs comprise at least one first sidelink BWP and at least one second sidelink BWP, the first sidelink BWP belongs to a bandwidth capability range of a first type terminal, the second sidelink BWP belongs to a bandwidth capability range of a second type terminal, the first type terminal is a reduced capability (Redcap) terminal, the second type terminal is a non-Redcap terminal, a capability of the second type terminal is greater than a capability of the first type terminal, and the capability comprises a processing time latency; and determining a sidelink BWP satisfying a capability of the first terminal in the plurality of sidelink BWPs, wherein the first terminal is a Redcap terminal.

2. The method for sidelink bandwidth part configuration according to claim 1, further comprising:

sending capability information to a second terminal, wherein the capability information is used for indicating the capability of the first terminal.

3. The method for sidelink bandwidth part configuration according to claim 1, further comprising:

determining that a capability of the second terminal is the same as the capability of the first terminal; and performing sidelink communication with the second terminal based on the sidelink BWP satisfying the capability of the first terminal.

4. A method for sidelink bandwidth part configuration, performed by a second terminal, and comprising:

receiving capability information sent by a first terminal, wherein the capability information is used for indicating a capability of the first terminal; and determining a sidelink bandwidth part (BWP) satisfying the capability of the first terminal, and performing sidelink communication with the first terminal based on the sidelink BWP satisfying the capability of the first terminal, wherein the first terminal is a Redcap terminal;

wherein the sidelink BWP satisfying the capability of the first terminal is determined by the first terminal in a plurality of sidelink BWPs configured by a network device, a first number of sidelink BWPs in the plurality of sidelink BWPs are indicated by system information, the first number is less than the total number of the plurality of sidelink BWPs, and a remaining sidelink BWP other than the first number of sidelink BWPs in the plurality of sidelink BWPs is located within 20 MHz near a center frequency of the sidelink BWPs configured based on the system information; and wherein the plurality of sidelink BWPs comprise at least one first sidelink BWP and at least one second sidelink BWP, the first sidelink BWP belongs to a bandwidth capability range of a first type terminal, the second sidelink BWP belongs to a bandwidth capability range of a second type terminal, the first type terminal is a reduced capability (Redcap) terminal, the second type terminal is a non-Redcap terminal, a capability of the second type terminal is greater than a capability of the first type terminal, and the capability comprises a processing time latency.

5. A method for sidelink bandwidth part configuration, performed by a network device, and comprising:

sending system information to a first terminal, wherein the system information is used for determining sidelink BWP configuration information;

wherein the sidelink BWP configuration information is used for indicating a plurality of sidelink BWPs, the system information is used for indicating a first number of sidelink BWPs in the plurality of sidelink BWPs, the first number is less than the total number of the plurality of sidelink BWPs, and a remaining sidelink BWP other than the first number of sidelink BWPs in the plurality of sidelink BWPs is located within 20 MHz near a center frequency of the sidelink BWPs configured based on the system information;

wherein the sidelink BWP configuration information is used by the first terminal to determine a sidelink BWP satisfying a capability of the first terminal in the plurality of sidelink BWPs, and the first terminal is a Redcap terminal; and wherein he plurality of sidelink BWPs comprise at least one first sidelink BWP and at least one second sidelink BWP, the first sidelink BWP belongs to a bandwidth capability range of a first type terminal, the second sidelink BWP belongs to a bandwidth capability range of a second type terminal, the first type terminal is a Redcap terminal, the second type terminal is a non-Redcap terminal, a capability of the second type terminal is greater than a capability of the first type terminal, and the capability comprises a processing time latency.

6. An apparatus for sidelink bandwidth part configuration, comprising:

a processor; and a memory, configured to store an instruction executable by the processor;

wherein the processor is configured to: perform the method for sidelink bandwidth part configuration according to claim 1.

7. The method for sidelink bandwidth part configuration according to claim 1, further comprising:

determining that the capability of the second terminal is different from the capability of the first terminal; and performing sidelink communication with the second terminal based on a sidelink BWP satisfying the capability of the second terminal.

8. An apparatus for sidelink bandwidth part configuration, comprising:

a processor; and a memory, configured to store an instruction executable by the processor;

wherein the processor is configured to perform the method for sidelink bandwidth part configuration according to claim 4.

9. An apparatus for sidelink bandwidth part configuration, comprising:

a processor; and a memory, configured to store an instruction executable by the processor;

wherein the processor is configured to perform the method for sidelink bandwidth part configuration according to claim 5.

* * * * *